July 8, 1930.  M. SOSS  1,770,091
LAWN MOWER
Filed Sept. 4, 1928  2 Sheets-Sheet 1
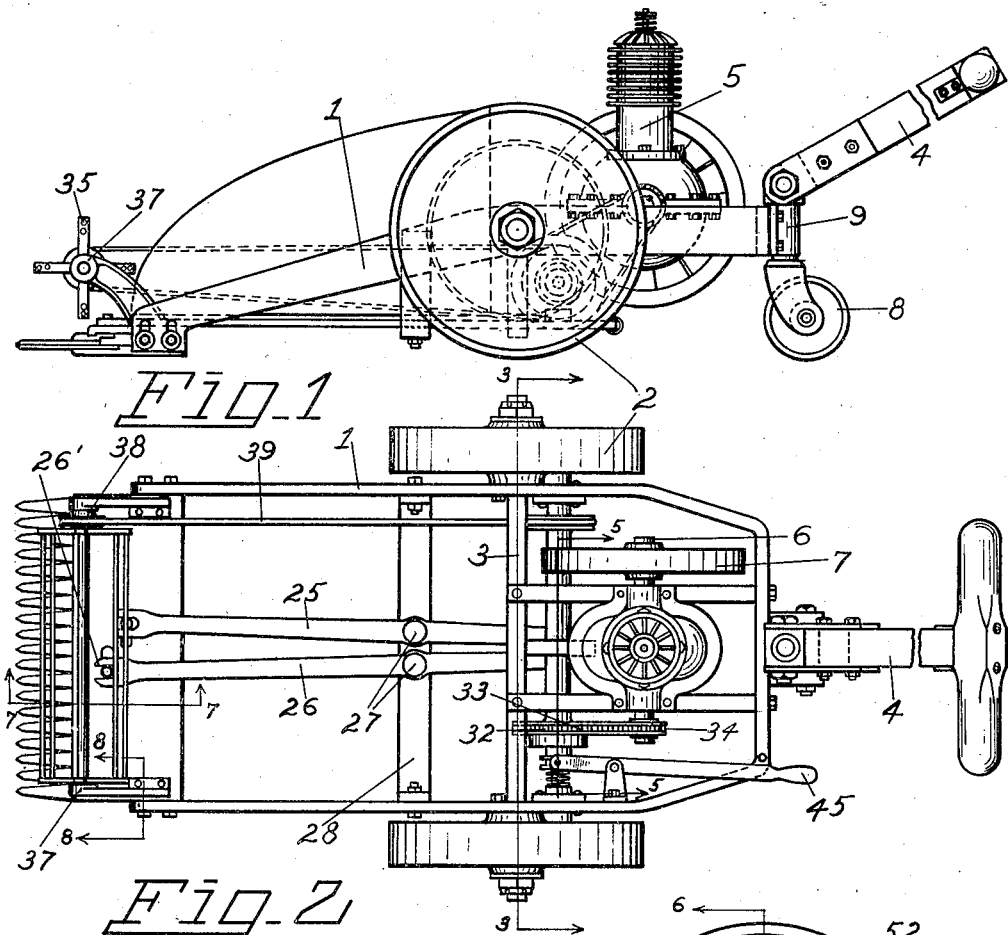
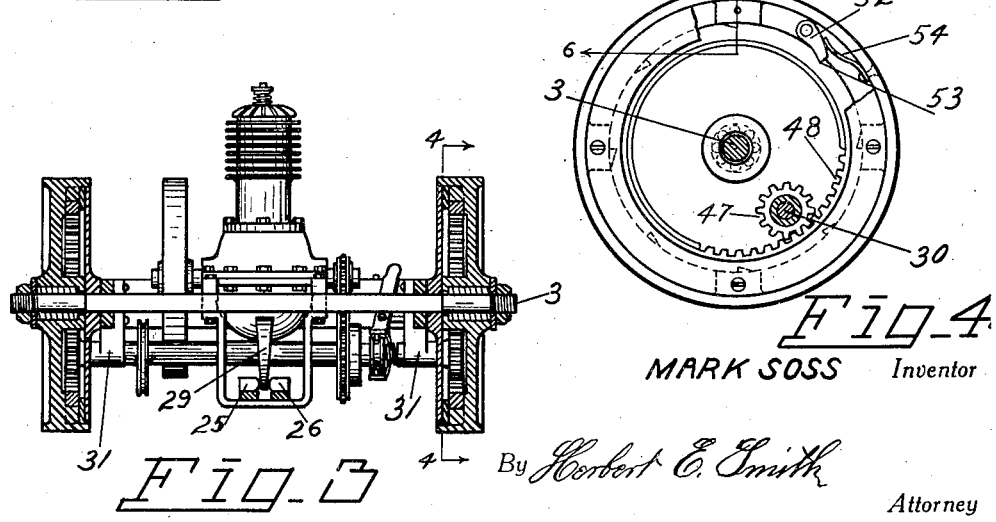
MARK SOSS Inventor
By Herbert E. Smith
Attorney July 8, 1930.　　　M. SOSS　　　1,770,091
LAWN MOWER
Filed Sept. 4, 1928　　　2 Sheets-Sheet 2
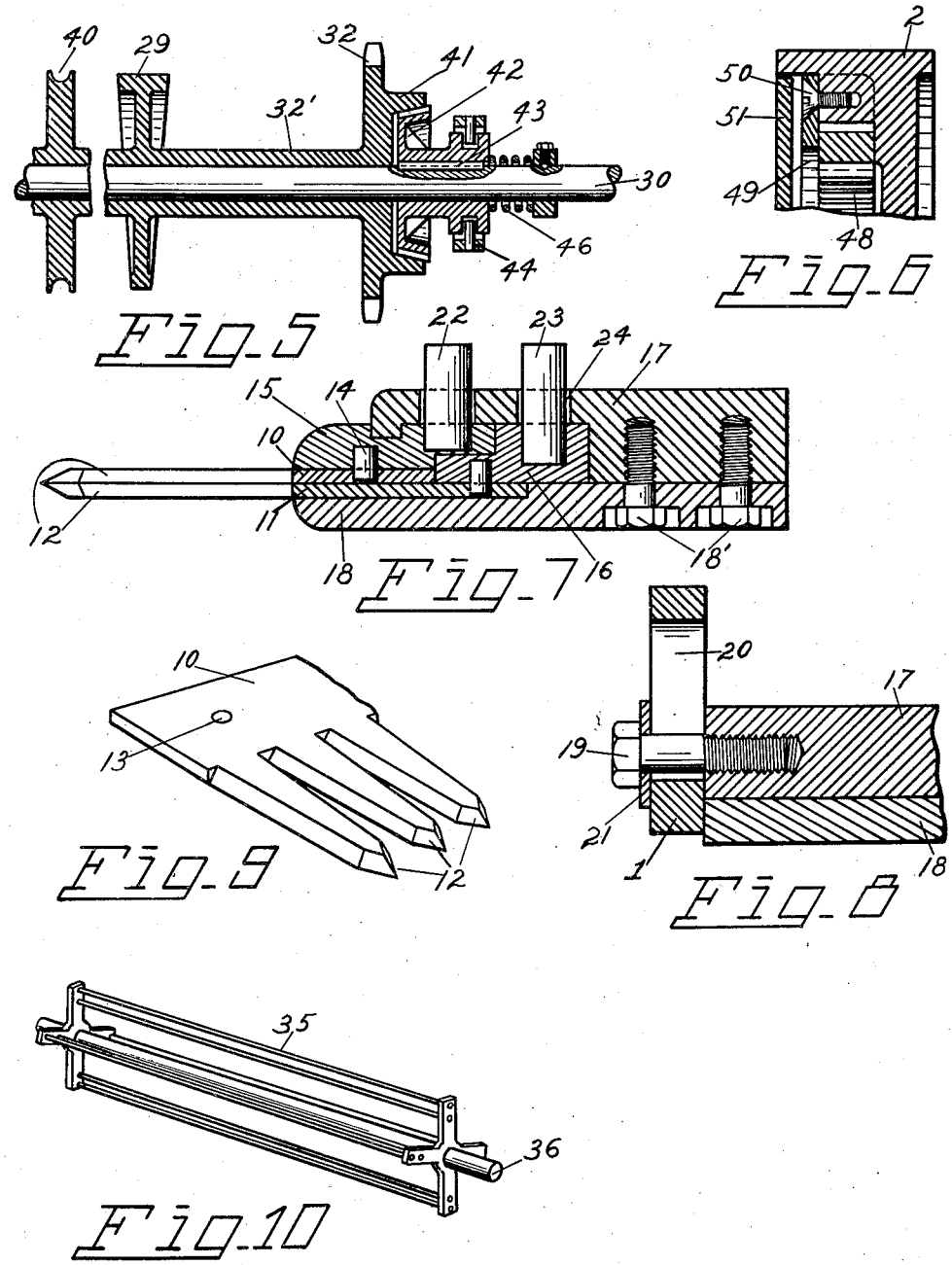
MARK SOSS　Inventor
By Herbert E. Smith
Attorney Patented July 8, 1930

1,770,091

UNITED STATES PATENT OFFICE

MARK SOSS, OF SPOKANE, WASHINGTON

LAWN MOWER

Application filed September 4, 1928. Serial No. 303,857.

My present invention relates to an improved lawn mower of the type utilizing horizontally and transversely arranged, reciprocating cutters that are power-actuated, and means are provided whereby the power device or motor may be utilized for propulsion of the mower. The mower or implement is of the "walking" type and means are provided whereby the mover may be manually pushed forward and manually guided, or the mower may be propelled under power from its motor and guided manually. While the mower may be used in various ways, it is particularly designed for use on lawns where shrubbery, trees, hedges &c. are present, and it is necessary to trim around these objects, and to this end the horizontally reciprocating cutters may be utilized with facility by manipulating or guiding the motor in and out of the shrubbery &c.

The invention consists in certain novel combinations and arrangements of parts whereby the functions of the machine or implement are carried out, as will hereinafter be more fully set forth and claimed.

In the accompanying drawings I have illustrated one complete example of the physical embodiment of my invention, wherein the cutters are operated, and the mower may also be propelled, by power from an internal combustion engine or motor, but it will be understood that an electric motor, or other type of motor, may be substituted for the motor illustrated, and other changes may be made within the scope of my claims without departing from the principles of my invention. The parts are combined and arranged in the exemplified structure according to the best mode I have thus far devised for the practical application of the principles of my invention.

Figure 1 is a view in side elevation of a mower embodying my invention. Figure 2 is a top plan view of the mower. Figure 3 is a transverse, vertical sectional view at line 3—3 of Figure 2. Figure 4 is a sectional detail view as at line 4—4 of Figure 3 showing the driving gear for propelling the mower under power. Figure 5 is an enlarged sectional view, as at line 5—5 of Figure 2 showing the operating cam for the cutters and the clutch device for propelling the mower under power. Figure 6 is an enlarged detail sectional view at line 6—6 of Figure 4. Figure 7 is an enlarged, transverse sectional view of the cutter bars as at line 7—7 of Figure 2. Figure 8 is a detail sectional view of the adjusting members for the cutter bars at line 8—8 of Figure 2. Figure 9 is a detail, perspective view at one end of one of the cutters. Figure 10 is a perspective view of a reel or beater, carried in horizontal position above the cutters for beating the grass down to the cutters.

In carrying out my invention I utilize a horizontally disposed, generally U-shaped frame 1 which is supported on the traction wheels 2 that are journaled outside of the frame on the transverse axle 3, and the implement may be pushed or pulled, manually, for a "walking" implement by utilization of the handle 4 which is also used to guide the implement whether it is power propelled or manually propelled.

An internal combustion engine or motor 5 is suitably mounted on the frame back of the axle 3 and its shaft 6, which extends transversely of the mower is provided with the usual fly wheel or balance wheel 7. In addition to the two traction wheels 2, a swiveled or castor wheel 8 is journaled at 9 at the rear of the frame to support the mower and for steering purposes.

At the front of the mower a pair of transversely disposed, horizontally reciprocable cutter blades 10 and 11 are located, one above the other, and each blade is provided with a series of spaced knives or cutters 12 having sharpened or beveled edges between which the blades of grass are cut as the blades of the cutters reciprocate. Each of these upper and lower cutter blades 10 and 11 have one or more holes 13 therein for the reception of retaining pins or dowel pins 14 that are carried by the front and rear cutter bars 15 and 16 respectively. The cutter blades and their cutter bars reciprocate and are guided in a transversely extending housing fixed at the front of the frame 1 and composed of an upper plate 17 and a lower plate 18 that are fashioned to enclose the cutter blades and cutter bars and are secured together by clamp bolts 18' as best seen in Figure 7.

The cutters may be vertically adjusted with relation to the frame for a short or longer cut of the grass by means of a pair of bolts 19, that pass through vertical slots 20 in a part of the frame 1, and are threaded into the upper plate 17, as best seen in Figure 8, and a washer plate 21 on the bolt is used to insure proper friction and support for the bolt. One of the adjusting bolts 19 is used at each side of the front of the mower for adjusting the ends of the cutters.

The cutters are reciprocated transversely of the mower in a horizontal plane and for this purpose each cutter bar 15 and 16 is provided with a pin as 22 and 23 that projects upwardly through slots 24 in the overhanging part of the housing-plate 17 the slots extending longitudinally of the plates to permit free movement of the pins therein for accomplishing the reciprocating movements of the cutters.

The cutters are reciprocated through the co-action therewith of a pair of levers 25 and 26 that extend along the longitudinal axis of the mover and have notches 26' at their front free ends for straddling the pins 22 and 23 of the cutter bars. In front of the axle 3 these levers are fulcrumed or pivoted at 27 on the cross bar 28 of the main frame 1, and springs may be used at the pivots for normally tending to spread apart the forward ends of the levers. The rear arms of the levers are spaced at opposite sides of the longitudinal center of the mower for frictional contact with an operating cam 29 that is disposed in a vertical plane between the ends of the levers, and as the high surfaces of this double cam revolve in contact with the respective lever arms, these rear arms are spread apart while the fore arms of the levers are drawn together, and then the springs separate the fore arms, for accomplishing the reciprocal cutting movements of the cutters.

The cam 29 is carried by an operating shaft 30 disposed transversely of the mower a little below and at the rear of the axle 3 and journaled to revolve in bearings 31 of the main frame. This operating shaft is driven from the motor shaft through the instrumentality of a sprocket wheel 32 that is integral with a sleeve 32' with which sleeve the cam 29 is also integral, and the sleeve is loosely mounted on the shaft 30, but adapted to be clutched thereto for driving the shaft. A chain 33 from the sprocket wheel 34 on the motor shaft transmits power to the operating shaft 30 and it will be apparent that the reciprocating cutters are operated by the chain through the sprocket 32, sleeve 32', cam 29 and the levers as described.

A rotary beater or reel is located at the front of the mower, and indicated, as 35, for passing the cut grass rearwardly to a bag or other receptacle carried by the mower. The beater is provided with a shaft 36 that is journaled transversely of the mower in bearings 37 and it is driven through the use of a pulley 38 on its shaft, belt 39, and a drive pulley 40 carried on the shaft 30 and preferably integral with the sleeve 32' of the cutter operating device.

For transmitting power to the operating shaft 30 to propel the mower I use a socket clutch member 41 integral with the sprocket wheel 32, and the cone shaped clutch member 42 for co-action therewith and adapted to slide on the shaft 30. The clutch member 42 is slidable on the shaft and rotatable therewith through the use of the key 43, and the usual yoke 44, lever 45, and spring 46 are used for shifting the clutch member 42, which when in frictional engagement with the member 41 transmits power from member 41 to the shaft 30.

On the ends of the operating shaft are a pair of driving pinions 47 that engage the teeth of a pair of internal gear rings 48 located within the traction wheels 2 and retained therein by means of retaining rings 49 that are screwed at 50 to the wheels.

A stationary shield plate or disk 51 is mounted on the frame for closing the inner side of each wheel, and pawls 52 pivoted within the wheel are held in complementary notches 53 in the gear ring by springs 54. The spring pressed pawls of course permit idle, reverse turning of the wheels in one direction, but through their engagement with the notches the pawls cause propulsion of the mower through the driving wheels or traction wheels 2. This arrangement of the driving-ratchet also permits facile turning of the mower to right or left for guiding the mower, whether the mower is power propelled or manually pushed or pulled.

Having thus fully described my invention what I claim as new and desire to secure by Letters Patent is:—

1. The combination with a guide-housing having slots, a pair of cutter blades and cutter bars for said blades reciprocable in the housing, and pins on said cutter bars projecting through said slots, of a pair of separately pivoted levers having end notches for engaging the upper ends of said pins, an operating shaft and driving means therefor, a cam disk on said shaft and cams at the opposite sides of the disk for frictional engagement with said levers.

2. In a mower, the combination with a sectional housing having slots in its upper wall, of a wide cutter blade and a narrow cutter blade, said cutter blades having holes therein and located within the housing, a pair of overlapping cutter bars having retaining pins for engagement in said holes, a pair of operating pins on the bars, levers for engaging the operating pins, and means for operating the levers.

In testimony whereof I affix my signature.

MARK SOSS.